United States Patent
Elwailly et al.

(10) Patent No.: US 9,608,716 B1
(45) Date of Patent: Mar. 28, 2017

(54) SATELLITE TRANSMIT ANTENNA GROUND-BASED POINTING

(71) Applicant: Space Systems/Loral, LLC, Palo Alto, CA (US)

(72) Inventors: Farid Elwailly, San Jose, CA (US); William Hreha, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 15/092,413

(22) Filed: Apr. 6, 2016

(51) Int. Cl.
| H04B 7/185 | (2006.01) |
| H04B 7/204 | (2006.01) |
| H04B 7/19 | (2006.01) |
| H04B 17/40 | (2015.01) |

(52) U.S. Cl.
CPC .......... *H04B 7/18519* (2013.01); *H04B 7/19* (2013.01); *H04B 7/2041* (2013.01); *H04B 17/40* (2015.01)

(58) Field of Classification Search
CPC .. H04B 7/2041; H04B 7/18513; H04B 17/21; H04B 7/0617; H04B 7/0408; H04B 7/18543
USPC .... 455/12.1, 13.4, 427, 428, 429, 431, 3.01, 455/23, 445, 422.1, 403, 500, 517, 550.1, 455/522.1, 69, 68; 342/359, 354, 368, 342/174, 358; 370/310, 315, 316
See application file for complete search history.

(56) References Cited

U.S. PATENT DOCUMENTS

| 3,772,701 | A | 11/1973 | Wilkinson |
| 4,599,619 | A | 7/1986 | Keigler et al. |
| 5,043,737 | A | 8/1991 | Dell-Imagine |
| 5,697,050 | A | 12/1997 | Wiedeman |
| 6,150,977 | A | 11/2000 | Wilcoxson et al. |
| 6,184,825 | B1 | 2/2001 | Wehner et al. |
| 6,236,361 | B1 | 5/2001 | Rosen |
| 6,321,065 | B1 | 11/2001 | Wilcoxson et al. |
| 6,393,255 | B1 | 5/2002 | Lane |
| 6,856,284 | B1 | 2/2005 | Cangiani |
| 6,989,786 | B1 | 1/2006 | Dong |
| 7,274,329 | B2 | 9/2007 | Fowell et al. |
| 8,270,899 | B2 | 9/2012 | Walker et al. |
| 8,339,307 | B2 | 12/2012 | Craig et al. |
| 8,395,546 | B2 | 3/2013 | Chang |
| 8,723,724 | B2 | 5/2014 | Mendelsohn et al. |
| 8,817,694 | B2 | 8/2014 | Chang |
| 2002/0158797 | A1 | 10/2002 | Kelly et al. |
| 2004/0203444 | A1 | 10/2004 | Jarett |
| 2005/0048915 | A1 | 3/2005 | Westall |

(Continued)

FOREIGN PATENT DOCUMENTS

| CA | 998458 | 10/1976 |
| CA | 1197315 | 11/1985 |

(Continued)

*Primary Examiner* — Keith Ferguson
(74) *Attorney, Agent, or Firm* — Weaver Austin Villeneuve & Sampson LLP

(57) ABSTRACT

This disclosure provides systems, methods and apparatus for determining beamforming coefficients that correct for pointing errors. In one aspect, a subsystem of a ground station can receive calibration signals from a satellite. The properties of the calibration signals can be measured and used to determine the pointing error of the satellite. Beamforming coefficients based on the pointing error can be provided by the ground station to the satellite.

22 Claims, 5 Drawing Sheets

(56) References Cited

U.S. PATENT DOCUMENTS

| | | |
|---|---|---|
| 2006/0181455 A1 | 8/2006 | Hudson et al. |
| 2008/0291079 A1 | 11/2008 | Chang |
| 2008/0291083 A1 | 11/2008 | Chang |
| 2008/0291864 A1 | 11/2008 | Chang |
| 2010/0013703 A1* | 1/2010 | Tekawy .................. G01S 19/02 342/357.395 |
| 2010/0062706 A1 | 3/2010 | Mills et al. |
| 2010/0099370 A1 | 4/2010 | Nichols et al. |
| 2010/0231442 A1 | 9/2010 | Craig et al. |
| 2011/0032867 A1* | 2/2011 | Gayrard ............. H04B 7/18515 370/316 |
| 2014/0022120 A1 | 1/2014 | Mendelsohn et al. |

FOREIGN PATENT DOCUMENTS

| | | |
|---|---|---|
| CN | 101296018 | 10/2008 |
| CN | 202395772 | 8/2012 |
| KR | 100980732 | 9/2010 |

\* cited by examiner

SATELLITE TRANSMIT ANTENNA GROUND-BASED POINTING

TECHNICAL FIELD

This disclosure relates generally to ground-based satellite beam pointing, and more particularly to a transmit antenna pointing system used by a ground station to adjust the direction in which a satellite transmit antenna points its beam.

BACKGROUND

Spacecraft for communications and broadcast services can operate in geosynchronous orbit to communicate with a ground device (user terminal) by way of a forward user downlink/return user uplink beam that communicatively couples the user terminal and the spacecraft. The positioning, or pointing, of the forward user downlink/return user uplink beam can drift over time, for example, due to temperature changes on the spacecraft, drifts in orbit, etc.

Transmit Antenna Pointing is a technique in which the antenna beam formed on the satellite and pointing to the ground is adjusted to compensate for satellite drifts that occur over time. This adjustment is made by measuring the drift in satellite orientation in some fashion, such as by receiving a beacon from the ground and estimating from that the presumed pointing error in the transmit beams and mechanically correcting the transmit pointing by moving the transmit antenna.

Beamforming is a technique in which a phased array antenna is configured to position the forward user downlink/return user uplink beam such that it is optimized in data capacity at a specific location of the ground device. Beamforming coefficients can be used to adjust the forward user downlink/return user uplink beam's phase and amplitude at the phased array transmitter/receiver to change the pointing of the beam to account for satellite drift, and therefore, increase the data capacity of the user signals. However, using beamforming to adjust pointing by determining the beamforming coefficients on the satellite can be computationally prohibitive. Additionally, implementing the beamforming coefficient determination system on the spacecraft can increase its cost and weight.

Thus, an improved system for determining beamforming coefficients to correct for pointing errors is desired.

SUMMARY

The systems, methods and devices of this disclosure each have several innovative aspects, no single one of which is solely responsible for the desirable attributes disclosed herein.

One innovative aspect of the subject matter described in this disclosure can be implemented in a system comprising a ground station configured to make a comparison of a set of beacon signals in calibration beams provided by a spacecraft; generate a pointing error estimate for the spacecraft based on the comparison; and provide updated beamforming coefficients to the spacecraft based on the pointing error estimate.

In some implementations, the set of calibration beams includes a first beam positioned opposite of a second beam as a first beam pair, and a third beam positioned opposite of a fourth beam as a second beam pair, and the comparison includes determining a first difference corresponding to the first beam pair, and a second difference corresponding to the second beam pair.

In some implementations, the first difference corresponds to a difference in power levels of the first beam and the second beam, and the second difference corresponds to a difference in power levels of the third beam and the fourth beam.

In some implementations, the power levels of the calibration beams are measured from a position of the ground station.

In some implementations, the set of calibration beams includes three overlapping beams, and the comparison includes comparing powers of the corresponding beacons in the three overlapping beams.

In some implementations, the set of beacon signals are compared by measuring the phase of each beacon and the differences in phase are used to determine the pointing error estimate.

In some implementations, the beamforming coefficients are compressed before being sent to the spacecraft.

In some implementations, the set of calibration beams provide corresponding spread spectrum signals beneath noise floors of communication signals provided by the spacecraft.

In some implementations, the comparison of the set of calibration beams includes determining differences between power levels of respective calibration beams, the power levels being compared to generate a raw vector error representing the differences between the power levels.

In some implementations, the ground station is configured to determine an updated running average of raw vector errors with the raw vector error representing the differences between the power levels.

In some implementations, the ground station is configured to use the updated running average of raw vector errors to generate the pointing error estimate.

Another innovative aspect of the subject matter described in this disclosure can be implemented in a communications calibration sub-system configured to measure signal powers of calibration signals received from a spacecraft, and the sub-system configured to generate a pointing error estimate representing drift of the spacecraft based on the measured signal powers of the calibration signals, and generate beamforming coefficients for the spacecraft based on the pointing error estimate to adjust amplitudes and phases of communication signals provided by the spacecraft to account for the drift of the spacecraft.

In some implementations, the sub-system can be further configured to update a running average of the signal powers of the calibration signals and use the running average to generate the pointing error estimate.

In some implementations, the beamforming coefficients are compressed before sending to the spacecraft.

In some implementations, the calibration signals are spread spectrum signals beneath noise floors of the communication signals.

In some implementations, the communication signals are forward user downlink/return user uplinks signals.

In some implementations, the calibration signals includes a first signal positioned opposite of a second signal as a first signal pair, and a third signal positioned opposite of a fourth signal as a second signal pair, and the measured signal powers correspond to determining a first difference corresponding to the first signal pair, and a second difference corresponding to the second signal pair.

In some implementations, the first difference corresponds to a difference in power levels of the first signal and the second signal, and the second difference corresponds to a difference in power levels of the third signal and the fourth signal.

In some implementations, the sub-system is further configured to generate a raw vector error representing the first difference and the second different, and the pointing error estimate is based on the raw vector error.

Another innovative aspect of the subject matter described in this disclosure can be implemented in a method comprising receiving, by a ground station, calibration signals transmitted by a spacecraft; determining, by the ground station, power levels of the calibration signals; estimating, by the ground station, a pointing error of communication signals transmitted by the spacecraft based on the power levels of the calibration signals; generating, by the ground station, beamforming coefficients for the communication signals based on the pointing error; and transmitting, by the ground station, the beamforming coefficients to the spacecraft.

In some implementations, the method comprises generating a raw vector error corresponding to differences in the power levels of the calibration signals; and updating a running average of raw vector errors with the raw vector error, wherein the pointing error is based on the running average indicating an average of the differences of the power levels.

In some implementations, the calibration signals include a first signal positioned opposite of a second signal as a first signal pair, and a third signal positioned opposite of a fourth signal as a second signal pair, and the determining the power levels includes determining a first difference in power levels corresponding to the first signal pair, and a second difference in power levels corresponding to the second signal pair.

In some implementations, the calibration signals are spread spectrum signals beneath noise floors of the communication signals.

In some implementations, the beamforming coefficients are compressed before being transmitted to the spacecraft.

BRIEF DESCRIPTION OF THE DRAWINGS

The included drawings are for illustrative purposes and serve only to provide examples. These drawings in no way limit any changes in form and detail that may be made by one skilled in the art without departing from the spirit and scope of the disclosed embodiments.

Figure 1:
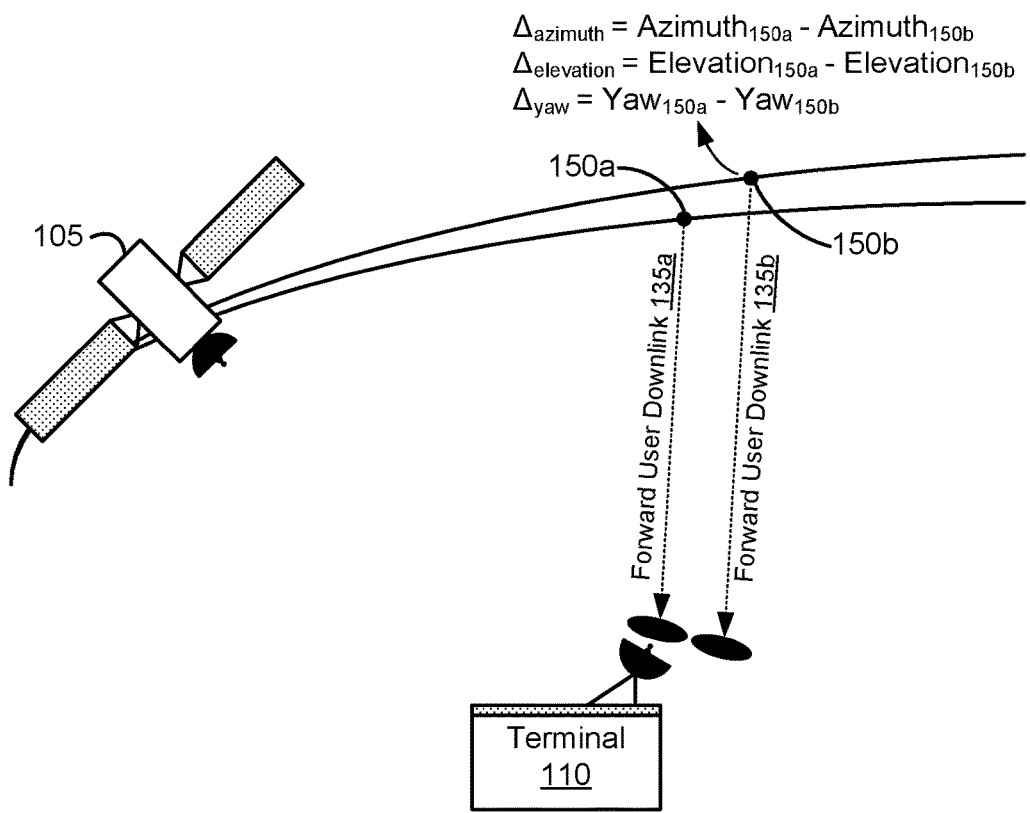
FIG. 1 is an example of a satellite communications network.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Specific exemplary embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The terms "spacecraft", "satellite" may be used interchangeably herein, and generally refer to any orbiting satellite or spacecraft system.

FIG. 1 is an example of a satellite communications network. The satellite communications network in FIG. 1 includes satellite 105 at an orbital location providing downlink communication with terminal 110 (e.g., a user device, such as a phone, tablet, laptop, transportation vehicle such as airplanes, cars, trains, ships, etc.) via generation of forward user downlink/return user uplink beams. Satellite 105 can incorporate beamforming to form the forward user downlink/return user uplink beams to provide data to terminal 110. Beamforming is a technique in which the forward user downlink/return user uplink beam is adjusted at a phased array transmitter/receiver of satellite 105 using beamforming coefficients to form a narrow spot beam to increase the data capacity at the position on Earth corresponding to terminal 110.

As an example, satellite 105 might be expected to drift to position 150a and provide forward user downlink/return user uplink beam 135a with a particular beamforming coefficient. The beamforming coefficient is used to determine a phase and amplitude of forward user downlink/return user uplink beam 135a at a particular phase array transmitter/receiver such that it is pointed at a spot to increase the data capacity of the beam at the position of terminal 110.

However, the positioning, or pointing, of the forward user downlink/return user uplink beam towards the ground device can drift over time, for example, due to temperature changes on the spacecraft, drifts in orbit, and other factors. As a result, if satellite 105 drifts to position 150b rather than position 150a, forward user downlink/return user uplink beam 135b can be used to communicate with terminal 110. However, as shown in FIG. 1, the spot beam corresponding to forward user downlink/return user uplink beam 135b is slightly off from the position corresponding to forward user downlink/return user uplink beam 135a (if satellite 105 was at position 150a), resulting in a lower data capacity than forward user downlink/return user uplink beam 135a. That is, the beamforming coefficients for forward user downlink/return user uplink beam 135a from position 150a would differ from the beamforming coefficients of forward user downlink/return user uplink beam 135b from position 150b if both are to point similarly. Accordingly, a pointing error for forward user downlink/return user uplink beam 135b decreases its data capacity at terminal 110 if it is using the beamforming coefficients tailored to position 150a rather than beamforming coefficients tailored to position 150b. In some implementations, positions 150a and 150b might differ in azimuth, elevation, and/or yaw of spacecraft 105 from the perspective of the position of terminal 110, and therefore, different beamforming coefficients may be used to increase data capacity of the corresponding forward user downlink/return user uplink beam.

As a result, beamforming coefficients (for the different phased array transmitter/receiver providing forward user downlink/return user uplink beams) might need to be calibrated as satellite 105 drifts. In some scenarios, the beamforming coefficients can be determined onboard satellite 105. However, determining the beamforming coefficients can be computationally intensive and a burden to implement on a spacecraft. For example, implementing a calibration system for beamforming coefficients might increase the weight of satellite 105, degrade over time, or increase power requirements of satellite 105. In contrast and as described herein, a beamforming calibration system can be implemented with a ground station on Earth determining the beamforming coefficients, resulting in weight savings, cost savings, and reduced power requirements for spacecraft 105.

A beamforming calibration system can be implemented with satellite 105 transmitting spot beams (providing calibration signals) that can be received by a ground station that can be used to determine the differences in position or pointing errors of satellite 105 (e.g., the differences in azimuth, elevation, and/or yaw) by comparing measured power levels of the calibration signals. The ground station can generate beamforming coefficients to take into account the differences in position and transmit the beamforming coefficients to satellite 105, resulting in forward user downlink/return user uplink beam 135b being provided from position 150b to point similar to forward user downlink/return user uplink beam 135a from position 150a, and therefore, increase its data capacity at terminal 110.

Figure 2:
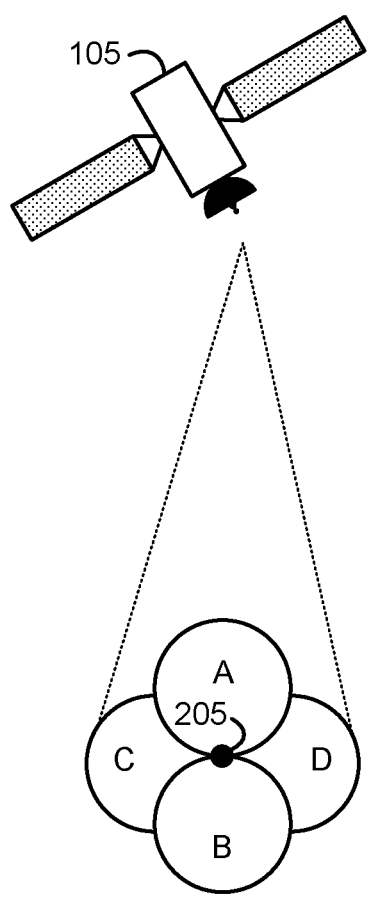
FIG. 2 is an example of a satellite providing four calibration beams for determining beamforming coefficients.

In more detail, FIG. 2 is an example of a satellite providing four calibration beams for determining beamforming coefficients. In FIG. 2, ground station 205 can be an earth station or terminal designed for communication with satellite 105. Satellite 105 can provide four spot beams A, B, C, and D that are positioned around ground station 205. Each of spot beams A-D may have portions that overlap with the other spot beams. In some implementations, separate beacons can be transmitted in each of the four spot beams and individually measured in ground station 205 to determine how accurately the satellite 105 is positioning the four spot beams A, B, C, and D.

Additionally, in some implementations, the beacons sent in spot beams A-D can be respective spread spectrum signals below a noise floor of communication beams (e.g., beams providing forward user downlink signals to terminals) to reduce interference. That is, calibration signals can be provided by the spot beams and avoid interfering with communication signals of satellite 105 to user terminals (e.g., terminal 110 in FIG. 1) by having their energy below the noise floor of the communication signals.

For example, in spread-spectrum communications, transmitted signals are spread within the frequency domain, resulting in signals with wider bandwidths. The calibration signals can be spread within a wider bandwidth and "buried" beneath the noise floors of the communication signals such as forward user downlink signals. As a result, the calibration signals can be perceived as slightly additional noise in respect to the communication signals and not interfere with them and allow for extraction of the data of the communication signals without interference from the calibration signals. The calibration signals can be extracted from beneath the noise floor by ground station 205 using spread-spectrum techniques If the beamforming coefficients are properly calibrated, in FIG. 2, ground station 205 would be equidistant from the centers of beams A-D and the communication signals provided by satellite 105 would be pointing to increase their data capacity. Accordingly, the magnitudes and/or the phases of the beacons in beams A-D as measured by ground station 205 should be the same, or relatively close to each other. However, if satellite 105 drifts, for example from position 150a to position 150b in FIG. 1, the pointing of beams A-D would also drift if the beamforming coefficients are not updated. This would also result in communication beams similarly being pointed incorrectly. For example, in FIG. 3, pointing 305 shows beams A-D provided such that ground station 205 is offset from the equidistant position from the centers of the beams.

As disclosed herein, new beamforming coefficients can be incrementally provided to satellite 105 by ground station 205 or another ground facility (e.g., a System Operations Center) and those beamforming coefficients can be used to generate beams A-D as well as communication beams provided to user terminals (different beams may use different beamforming coefficients). For example, ground station 205 can measure the power levels of beacons in beams A-D at its location and determine differences in those power levels. If the power levels are different, new beamforming coefficients can be generated and provided to satellite 105. The beamforming coefficients can be used to adjust the phase and amplitude of beams A-D, and other beamforming coefficients can be used to adjust the phase and amplitude of communication beams to change their pointing.

New beamforming coefficients can be incrementally provided to satellite 105 as ground station 205 moves closer to the equidistant point. Accordingly, the pointing of beams A-D would change, and if the pointing of beams A-D are such that beams A-D are measured to have power levels that are relatively the same, then the beamforming coefficients are properly calibrated for the desired pointing. Beamforming coefficients for communication beams, such as the forward user downlink/return user uplink beams, as previously discussed, can also be provided and can be determined to be calibrated based on the measured power levels of beams A-D being similar as they are similarly affected by the drift of satellite 105.

Figure 3:
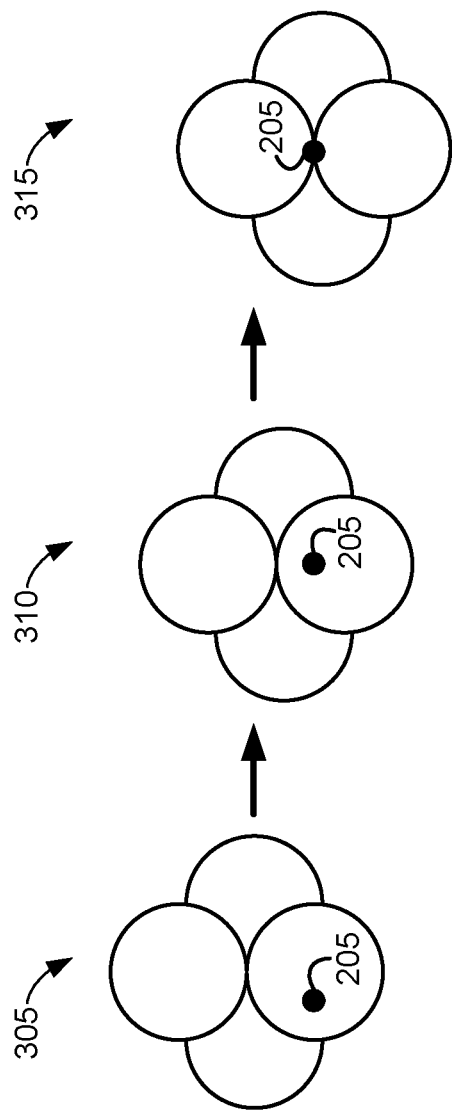
FIG. 3 is an example of the pointing of the four calibration beams being adjusted based on beamforming coefficients.

Continuing the example of FIG. 3, pointing 310 shows ground station 205 being slightly closer to the position equidistant from the centers of the beams than pointing 305. New beamforming coefficients can be generated again and provided to satellite 105. For example, pointing 315 shows beams A-D straddling ground station 205 such that it is equidistant from the centers of the beams after using the new beamforming coefficients (i.e., the beamforming coefficients provided following the measurement of power levels corresponding to pointing 310) to adjust the corresponding phases and amplitudes of signals. At this point, the beamforming coefficients account for the drift of satellite 105, and therefore, the currently-used beamforming coefficients provide adjustments to the phases and amplitudes of communication signals (e.g., forward user downlink/return user uplink beams) such that they point so that their data capacity is increased at terminals on Earth.

Figure 4:
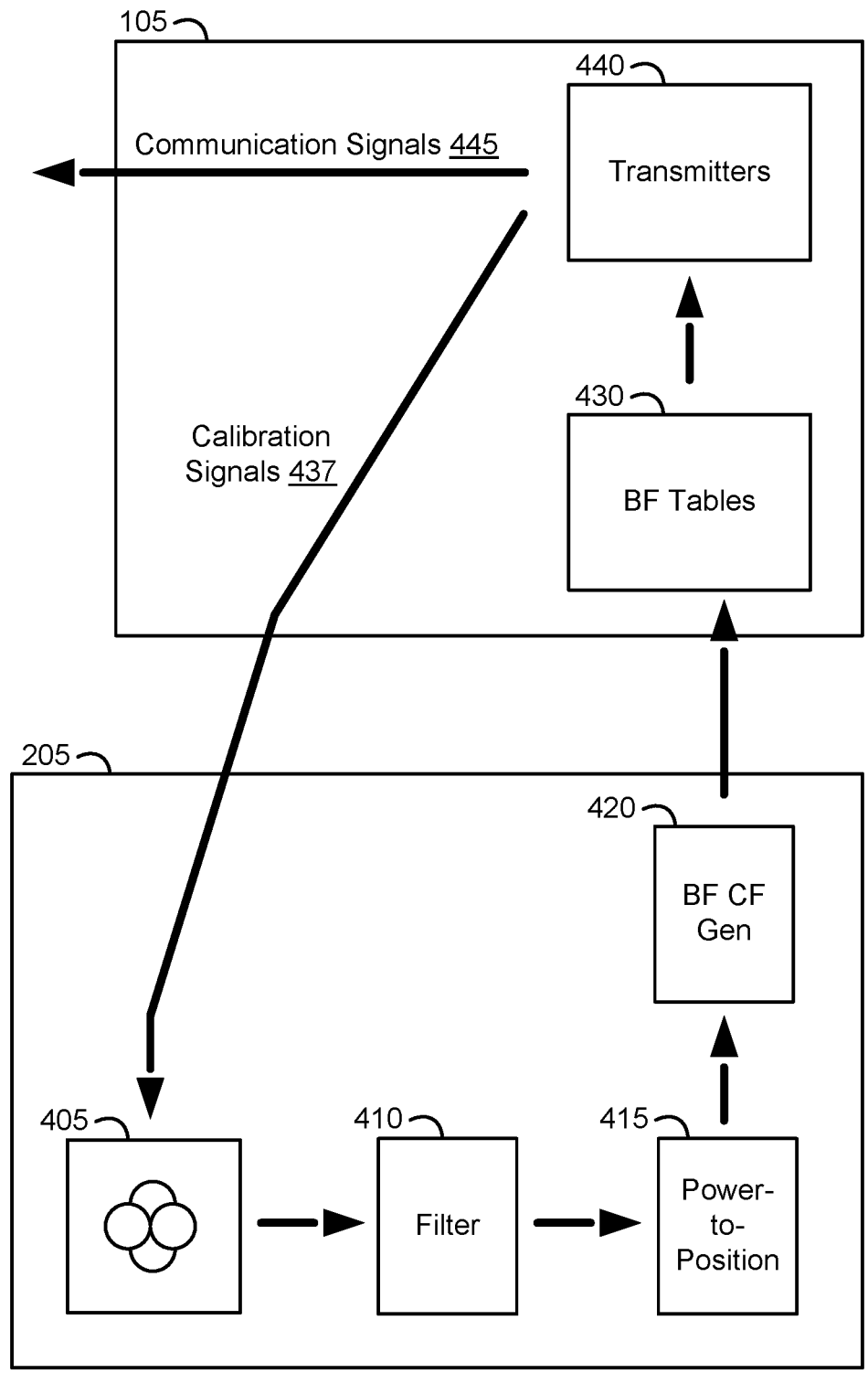
FIG. 4 is an example of a system block diagram of a satellite calibration system for adjusting the pointing of beams.

FIG. 4 is an example of a system block diagram of a satellite calibration system for adjusting the pointing of beams. In FIG. 4, satellite 105 can provide calibration beams 437 (e.g., beams A-D in FIG. 2) that are received by ground station 205, as previously discussed. Ground station 205 can include a variety of components that implement a part of a control loop as a sub-system of ground station 205 that can gradually adjust the beamforming coefficients of satellite 105 until they are calibrated. The components of ground station 205 can be implemented within a single ground station, multiple ground stations, or multiple different types of facilities. For example, filter 410 and power-to-position 415 can be implemented in a separate facility than the other components.

Figure 5:
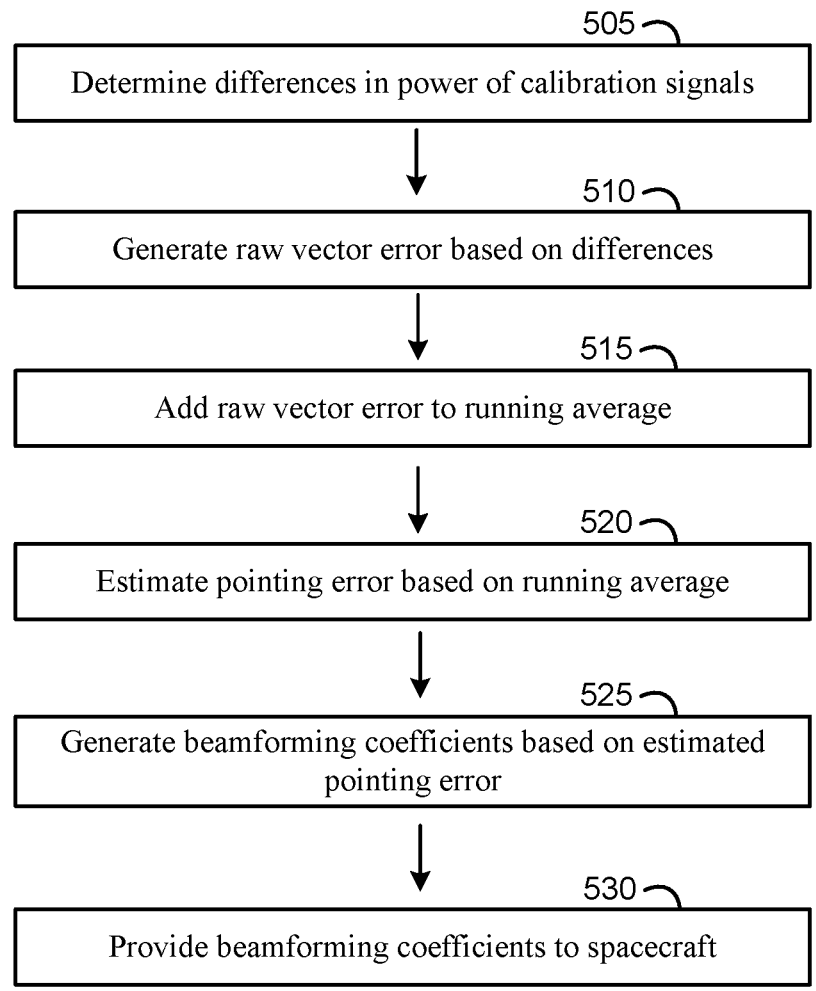
FIG. 5 is an example of a flowchart for determining beamforming coefficients for adjusting the pointing of beams using the system block diagram of FIG. 4.

FIG. 5 is an example of a flowchart for determining beamforming coefficients for adjusting the pointing of beams using the system block diagram of FIG. 4.

Referring to FIGS. 4 and 5, at block 505, differences between the measured powers of beams A-D providing the calibration signals can be determined. For example, in FIG. 4, power measurement 405 can be a component of ground station 205 that measures the powers (or power levels, signal levels, phases, etc.) of beacons in beams A-D. As previously discussed, four overlapping beams A, B, C, and D are provided by satellite 105 to carry calibration signals. In some implementations, each beam may provide a respective spread spectrum signal below a noise floor of communication signals 445 to reduce the interference (e.g., with forward user downlink signals). Ground station 205 positioned among the four beams A, B, C, and D can bring out, or extract, the corresponding signals from the noise floor and determine a power level for each of beams (or beacon signals) A, B, C, and D.

The power level of each of the four beams A, B, C, and D should be measured as being equal from the position of earth station 205 in the middle if no pointing error is present. However, to the extent that a pointing error is present, the power levels of the signals of beams A, B, C, and D may differ, as previously discussed. For example, if A is a beam positioned north of earth station 205, B is a beam positioned south of earth station 205, C is a beam positioned west of earth station 205, and D is a beam positioned east of earth station 205, then a north-south pair of A-B and a west-east pair of C-D can be analyzed. If satellite 105 is positioned slightly more north than expected, or if the beams are being pointed incorrectly, then the power level of the signal of beam A (i.e., the beam positioned north of earth station 205) would be larger while signal B (i.e., the beam positioned south of earth station 205) would be smaller. If satellite 105 is positioned properly or is using proper beamforming coefficients to account for its drift, then the power level of the signal of beam A should be similar to the power level of beam B, resulting in no difference between the power levels among the pair. Likewise, the power level of beam C should be similar to the power level of beam D. Accordingly, the power levels of the signals can be compared and differences between pairs of the power levels of the signals can be determined.

In some implementations, one or more other properties of the beams A-D can be measured. For example, the phases of the signals compared to each other can be used to determine the offset in the placement of beams A-D.

At block 510, a raw vector error based on the differences of the measured power levels can be generated. For example, power measurement 405 can a generate raw vector error indicating the differences in power levels, as previously discussed, that can represent raw position errors of the azimuth or elevation, of satellite 105.

In some implementations, the raw vector error can be provided to filter 410, which can be a loop filter. Filter 410 can be used to add stability to the calibration control loop implemented with earth station 205 and satellite 105. In some implementations, the control loop of which filter 410 is a part can remove from the generated correction measurement errors and those pointing errors that represent relatively short term drifts of satellite 105. Large, slowly changing, longer term drifts of satellite 105 are corrected.

For example, in some implementations, the raw vector error can be provided to filter 410, which can be a lead-lag filter. Filter 410 can be used to add stability to the calibration control loop implemented with earth station 205 and satellite 105. In some implementations, filter 410 can remove raw vector errors that represent relatively high impulse drifts of satellite 105 that cause large and quick changes in the measured power levels. That is, slowly-changing power level differences, such as those caused by slight drifts in orbit due to temperature changes, mechanical movements within satellite 105, etc. can be propagated through the control loop, but high impulses resulting in drastically changing power level differences may not be propagated through the control loop. Accordingly, if the raw vector error is above a threshold (representing a relatively large change), then it can be filtered out by filter 410 and not allowed to propagate through the rest of the control loop.

At block 515, the raw vector error can be provided to a running average of raw vector errors. For example, power-to-position 415 can add the raw vector error from the current iteration of the control loop (as filtered by filter 410) to a running average of the raw vector errors (based on previous iterations of the control loop) stored by power-to-position 415. Accordingly, power-to-position 415 can update the running average to include the new raw vector error, resulting in a slight change to the running average of the raw vectors if there is a difference between the raw vector error and the running average.

At block 520, a pointing error can be estimated based on the running average of the raw vector errors. For example, power-to-position 415 can correlate the updated running average of the raw vectors to provide estimates of the azimuth and elevation of satellite 105, or differences from the current estimated position of satellite 105 to its expected position (e.g., $\Delta_{azimuth}$, $\Delta_{elevation}$). Power-to-position 415 can use a lookup table or algorithm that can provide the azimuth and elevation, or pointing error estimates for those, based on the updated running average of the raw vectors.

At block 525, beamforming coefficients can be generated based on the estimated pointing error. In FIG. 4, beamforming coefficients generator 420 can generate beamforming coefficients from the estimated position generated by power-to-position 415.

As an example, the estimate can be compared with a beam description table to determine the beamforming coefficients for the estimate that would provide proper pointing of the signals generated by satellite 105. For example, the beam description table can provide the functionality of a lookup table or algorithm where for different pointing error estimate values, different sets of beamforming coefficients can be provided. The set of beamforming coefficients can include the beamforming coefficients for the phased array transmitter/receivers of satellite 105 and can include the beamforming coefficients for the user beams.

At block 530, the beamforming coefficients can be provided to a spacecraft. For example, the beamforming coefficients generated by beamforming coefficients generator 420 of ground station 205 can be uplinked to satellite 105. The beamforming coefficients can represent adjustments to phases and amplitudes of signals to be provided at the phase array transmitter/receivers 440 of satellite 105.

In some implementations, at block 530, the beamforming coefficients can be compressed before being sent to a spacecraft. For example the new beamforming coefficients can be compared to the old beamforming coefficients and only the update information (e.g., the differences between the new and old beamforming coefficients) is sent, allowing a satellite that currently has the old beamforming coefficients to update them into new beamforming coefficients.

Satellite 105 can store the beamforming coefficients in beamforming coefficient tables 430. When providing a signal at a phased array transmitter/receiver 440, satellite 105 can look up the corresponding beamforming coefficients and use that to adjust the amplitude and phase of the signal. For example, a beam providing a communication signal to Tokyo, Japan at a phased array transmitter/receiver 440 can have a different set of beamforming coefficients indicating adjustments to the communication signal than a beam providing a communication signal to Sydney, Australia at another phased array transmitter/receiver 440. As a result, communication signals 445 can be provided with adjustments to their amplitudes and phases to increase data capacity at terminals on Earth.

Continuing with the control loop depicted in FIG. 4, calibration signals 437 can be provided with adjustments based on the beamforming coefficients previously stored in beamforming coefficient tables 430. As a result, beams A-D providing the calibration signals can be slightly adjusted and the techniques described herein can be repeated, similar to the example of FIG. 3. For example, the components of earth station 205 can measure the power levels again (or other properties, such as phases, as previously discussed), generate a raw vector error, add the raw vector to the running average (based on the previous iteration of the control loop), estimate a position based on the new running average, and generate beamforming coefficients based on the estimated position.

New beamforming coefficients can be provided by the control loop until power measurement 405 generates a raw vector error indicating no differences in the power levels of the calibration signals. This would indicate that the beamforming coefficients used by satellite 105 to provide communication signals 445 and calibration signals 437 are properly calibrated to account for drifts, and therefore, pointing properly with the beamforming coefficients. As a result, the same beamforming coefficients would be generated and either ground station 205 may provide the same beamforming coefficients to satellite 105 or ground station 205 may determine that the beamforming coefficients are the same as those previously provided, and therefore, may hold off on providing the same beamforming coefficients to satellite 105. If satellite 105 drifts again, calibration signals 437 would be measured as having different power levels, and therefore, the control loop can begin to correct for the drift by generating and providing new beamforming coefficients.

In some implementations, the adjustment interval when new beamforming coefficients are provided to satellite 105 can be varied. For example, new beamforming coefficients can be generated and provided by earth station 205 every 10 minutes. If satellite 105 is determined to have drifted too much (i.e., its pointing error has drifted too much), then the adjustment interval can be decreased. For example, rather than every 10 minutes, new beamforming coefficients can be provided every 1 minute. When the pointing error has reduced beneath a threshold, the adjustment interval can be increased back to 10 minutes. In some implementations, new beamforming coefficients can be provided if the estimated pointing error has drifted above a threshold. As a result, the pointing of the beams can have some tolerance for the drift of satellite 105, but new beamforming coefficients can be provided if the drift meets or exceeds the threshold.

In some implementations, three beams providing calibration signals can be provided by satellite 105 and measured by ground station 205 rather than four beams as discussed in the previous examples. For example if three pointing beams, A, B, and C, are generated that straddle the ground station 205 at the points of an equilateral triangle, then a control loop that simultaneously equates the differences in power measurements (A-B, B-C, and C-A) of the beacons in A, B, and C, will place the beams such that the ground station 205 is centered in the triangle. In this example if the earth station 205 is closer to beam center A then A-B will be larger than B-C and C-A will be smaller than B-C hence the beams need to be moved such that the earth station 205 is slightly further from beam center A.

The control loop components can be implemented with a variety of hardware and software resources. For example, earth station 205 can include antennas, one or more processors, memory, circuits, etc. to implement the techniques described herein. Algorithms can be developed in programming languages, software tools and data formats that may be stored in any type of non-transitory computer-readable storage media to implement the techniques disclosed herein. The various algorithms can be distributed as desired between the earth station 205 and other system locations on the ground such as an Operations Center.

Thus, techniques have been disclosed wherein a calibration system determines beamforming coefficients used to form spot beams. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:
1. A system comprising:
a ground station configured to:
make a comparison of a set of beacon signals in calibration beams provided by a spacecraft by determining differences between power levels of respective calibration beams, the power levels being compared to generate a raw vector error representing the differences between the power levels;
generate a pointing error estimate for the spacecraft based on the raw vector error determined with the comparison; and
provide updated beamforming coefficients to the spacecraft based on the pointing error estimate.
2. The system of claim 1, wherein the set of calibration beams includes a first beam positioned opposite of a second beam as a first beam pair, and a third beam positioned opposite of a fourth beam as a second beam pair, and the comparison includes determining a first difference corresponding to the first beam pair, and a second difference corresponding to the second beam pair.
3. The system of claim 2, wherein the first difference corresponds to a difference in power levels of the first beam and the second beam, and the second difference corresponds to a difference in power levels of the third beam and the fourth beam.

4. The system of claim 3, wherein the power levels of the calibration beams are measured from a position of the ground station.

5. The system of claim 1, wherein the set of calibration beams includes three overlapping beams, and the comparison includes comparing powers of corresponding beacons in the three overlapping beams.

6. The system of claim 1, wherein the set of beacon signals are compared by measuring a phase of each beacon and differences in the phases are used to determine the pointing error estimate.

7. The system of claim 1, wherein the beamforming coefficients are compressed before being sent to the spacecraft.

8. The system of claim 1, wherein the set of calibration beams provide corresponding spread spectrum signals beneath noise floors of communication signals provided by the spacecraft.

9. The system of claim 1, wherein the ground station is configured to determine an updated running average of raw vector errors with the raw vector error representing the differences between the power levels.

10. The system of claim 9, wherein the ground station is configured to use the updated running average of raw vector errors to generate the pointing error estimate.

11. A communications calibration sub-system configured to measure signal powers of calibration signals received from a spacecraft, and the sub-system configured to generate a pointing error estimate representing drift of the spacecraft based on the measured signal powers of the calibration signals, and generate beamforming coefficients for the spacecraft based on the pointing error estimate to adjust amplitudes and phases of communication signals provided by the spacecraft to account for the drift of the spacecraft.

12. The sub-system of claim 11, further configured to update a running average of the signal powers of the calibration signals and use the running average to generate the pointing error estimate.

13. The sub-system of claim 11, wherein the beamforming coefficients are compressed before sending to the spacecraft.

14. The sub-system of claim 11, wherein the calibration signals are spread spectrum signals beneath noise floors of the communication signals.

15. The sub-system of claim 11, wherein the communication signals are forward user downlinks signals.

16. The sub-system of claim 11, wherein the calibration signals includes a first signal positioned opposite of a second signal as a first signal pair, and a third signal positioned opposite of a fourth signal as a second signal pair, and the measured signal powers correspond to determining a first difference corresponding to the first signal pair, and a second difference corresponding to the second signal pair.

17. The sub-system of claim 16, wherein the first difference corresponds to a difference in power levels of the first signal and the second signal, and the second difference corresponds to a difference in power levels of the third signal and the fourth signal.

18. The sub-system of claim 17, further configured to generate a raw vector error representing the first difference and the second different, and the pointing error estimate is based on the raw vector error.

19. A method comprising:
   receiving, by a ground station, calibration signals transmitted by a spacecraft;
   determining, by the ground station, power levels of the calibration signals;
   generating, by the ground station, a raw vector error corresponding to differences in the power levels of the calibration signals;
   updating, by the ground station, a running average of raw vector errors with the raw vector error;
   estimating, by the ground station, a pointing error of communication signals transmitted by the spacecraft based on the running average indicating an average of the differences of the power levels of the calibration signals;
   generating, by the ground station, beamforming coefficients for the communication signals based on the pointing error; and
   transmitting, by the ground station, the beamforming coefficients to the spacecraft.

20. The method of claim 19, wherein the calibration signals include a first signal positioned opposite of a second signal as a first signal pair, and a third signal positioned opposite of a fourth signal as a second signal pair, and the determining the power levels includes determining a first difference in power levels corresponding to the first signal pair, and a second difference in power levels corresponding to the second signal pair.

21. The method of claim 19, wherein the calibration signals are spread spectrum signals beneath noise floors of the communication signals.

22. The method of claim 19, wherein the beamforming coefficients are compressed before being transmitted to the spacecraft.

* * * * *